(12) United States Patent  
Goel et al.

(10) Patent No.: US 11,287,967 B2  
(45) Date of Patent: Mar. 29, 2022

(54) GRAPHICAL USER INTERFACE LIST CONTENT DENSITY ADJUSTMENT

(71) Applicant: Microsoft Technology Licensing, LLC, Redmond, WA (US)

(72) Inventors: Ankit Goel, Redmond, WA (US); Hillary Mucheru Mutisya, Seattle, WA (US); Mark Stephen Foster, Seattle, WA (US); Nathan Oshlag, Seattle, WA (US); Chantal M. Leonard, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1319 days.

(21) Appl. No.: 15/342,375

(22) Filed: Nov. 3, 2016

(65) Prior Publication Data

US 2018/0121047 A1     May 3, 2018

(51) Int. Cl.
*G06F 3/00* (2006.01)
*G06F 9/00* (2006.01)
*G06F 17/00* (2019.01)
*G06F 3/0485* (2022.01)

(52) U.S. Cl.
CPC .................................. *G06F 3/0485* (2013.01)

(58) Field of Classification Search
CPC ..................................................... G06F 3/0485
See application file for complete search history.

(56) References Cited

U.S. PATENT DOCUMENTS

| | | | |
|---|---|---|---|
| 7,134,083 B1 | 11/2006 | Guerrero | |
| 7,966,573 B2 | 6/2011 | Dodge et al. | |
| 9,043,714 B1 | 5/2015 | Queru | |
| 2004/0012627 A1 | 1/2004 | Zakharia et al. | |
| 2004/0095400 A1* | 5/2004 | Anderson | G06F 16/9577 715/864 |

(Continued)

OTHER PUBLICATIONS

Jacobs, et al., "Screen sizes and break points for responsive design", Retrieved on: Jul. 29, 2016; retrieved from «https://msdn.microsoft.com/en-us/windows/uwp/layout/screen-sizes-and-breakpoints-for-responsive-design»; 3 pages.

(Continued)

*Primary Examiner* — Tadesse Hailu
*Assistant Examiner* — Anita D Chaudhuri
(74) *Attorney, Agent, or Firm* — Ogilvie Law Firm

(57) ABSTRACT

Changes in display area automatically lead to changes in the format used to display graphical content of a list of items such as thumbnails or application icons, for example. A list display controller transitions between scrollable format and fixed format, and transitions between fixed formats with different numbers of display slots. Transitions may be triggered by window resizing, by moving a graphical user interface from one device to another while the application runs, or by switching between landscape and portrait mode, for example. Even when the format is not changed in response to a display area change, graphical content is automatically resized to match changes in the size of the display area containing the graphical content. Format transitions and content resizing help provide a pleasant user experience by maintaining content density with expected usage patterns for a given device, and reduce proliferation of code versions.

20 Claims, 7 Drawing Sheets

(56) References Cited

U.S. PATENT DOCUMENTS

| | | | |
|---|---|---|---|
| 2007/0192739 A1 | 8/2007 | Hunleth et al. | |
| 2008/0094421 A1* | 4/2008 | Maeda | G06F 3/0481 345/661 |
| 2009/0143052 A1* | 6/2009 | Bates | H04M 3/4931 455/414.2 |
| 2010/0073160 A1 | 3/2010 | Gilmour et al. | |
| 2011/0107266 A1 | 5/2011 | Hegde et al. | |
| 2012/0054673 A1* | 3/2012 | Kim | G06F 3/0482 715/784 |
| 2013/0044141 A1 | 2/2013 | Markiewicz et al. | |
| 2013/0057588 A1 | 3/2013 | Leonard et al. | |
| 2013/0067392 A1 | 3/2013 | Leonard et al. | |
| 2013/0067412 A1 | 3/2013 | Leonard et al. | |
| 2013/0171607 A1 | 7/2013 | Markiewicz et al. | |
| 2013/0326396 A1 | 12/2013 | Isensee et al. | |
| 2014/0055495 A1 | 2/2014 | Kim et al. | |
| 2014/0109008 A1 | 4/2014 | Zaman et al. | |
| 2014/0298219 A1 | 10/2014 | Kapur et al. | |
| 2014/0368547 A1* | 12/2014 | Elings | G06T 3/60 345/659 |
| 2015/0058763 A1 | 2/2015 | Leonard et al. | |
| 2015/0193403 A1 | 7/2015 | Zaman et al. | |
| 2016/0034434 A1 | 2/2016 | Guerrier et al. | |
| 2016/0041730 A1 | 2/2016 | Zaman et al. | |
| 2016/0173644 A1 | 6/2016 | Goel et al. | |
| 2016/0358311 A1* | 12/2016 | Chen | G06F 17/214 |

OTHER PUBLICATIONS

Gremillion, Ben, "Responsive Design of the Future with Flexbox", Published on: Dec. 20, 2012; retrieved from «http://blog.teamtreehouse.com/responsive-design-of-the-future-with-flexbox»; 11 pages.

Smus, Boris, "A non-responsive approach to building cross-device webapps", Published on: Apr. 24, 2012; retrieved from «http://www.html5rocks.com/en/mobile/cross-device/»; 11 pages.

Krnic, Tomislav, "Introduction to Responsive Web Design: Pseudo-Elements, Media Queries, and More", Retrieved on: Jul. 29, 2016; retrieved from «https://www.toptal.com/designers/responsive/introduction-to-responsive-web-design-pseudo-elements-media-queries»; 7 pages.

Rose, Dan, "Responsive, Fluid-Width, Variable-Item Navigation with CSS", Published: Jul. 29, 2014; retrieved from «https://www.sitepoint.com/responsive-fluid-width-variable-item-navigation-css/»; 16 pages.

Walker, et al., "Define page layouts with XAML", Retrieved on: Jul. 29, 2016; retrieved from «https://msdn.microsoft.com/en-us/windows/uwp/layout/layouts-with-xaml»; 17 pages.

"Layout-Responsive UI", Retrieved on: Jul. 29, 2016; retrieved from «https://material.google.com/layout/responsive-ui.html»; 16 pages.

Josh Byers, "A Beginner's Guide to Mobile Responsive Design", retrieved from «http://www.studiopress.com/beginners-guide-responsive-design/»; Mar. 16, 2012; 10 pages.

"Content Densities", retrieved from «https://help.sap.com/saphelp_nw75/helpdata/en/e5/4f729da8e3405fae5e4fe8ae7784c1/content.htm»; retrieved Sep. 21, 2016; 4 pages.

Vincent Hemmings, "Content Density—Importance for Usability and SEO", retrieved from «http://usabilitygeek.com/content-density-importance-for-usability-and-seo/»; Apr. 2, 2012; 9 pages.

"Simple Horizontal Navigation", retrieved from «http://css-snippets.com/simple-horizontal-navigation/»; Aug. 18, 2014; 18 pages.

Zac Bowden, "Windows 10 Redstone: Second wave of updates coming in 2017", retrieved from «http://www.winbeta.org/news/windows-10-redstone-rs2-to-launch-in-spring-2017-rs1-coming-this-june»; Mar. 3, 2016; 5 pages.

Ian Paul, "Windows Continuum: What happened when I used a Windows 10 phone as my PC", retrieved from «http://www.pcworld.com/article/3065895/windows/windows-continuum-how-i-survived-a-week-using-a-windows-10-phone-as-my-pc.html»; May 10, 2016; 6 pages.

"Universal Windows Platform apps", retrieved from «https://en.wikipedia.org/wiki/Universal_Windows_Platform_apps»; Aug. 16, 2016; 6 pages.

* cited by examiner

GRAPHICAL USER INTERFACE LIST CONTENT DENSITY ADJUSTMENT

BACKGROUND

Noon Smartphones, tablet computers, laptop computers, televisions, and many other devices often provide a graphical user interface to support interaction between the device and one or more human users. Users may operate the graphical user interface (GUI) using a mouse, pen, touchscreen, voice commands, and other input mechanisms, depending on the particular device. In addition to textual information, devices use GUIs to display graphical content such as icons, images, windows, scroll bars, pop-up or drop-down boxes, pointers, and menus. In particular, GUIs are sometimes used to display lists of graphical items, such as a list of icons representing respective application programs, a list of thumbnail images representing respective pieces of music or photos or video clips or movies, or a list of photos or avatar images representing respective contacts, to name a few of the many possible examples.

SUMMARY

Some technologies described herein are directed to the technical activity of automatically managing list content density in a graphical user interface, based on changes in available display area. Technical mechanisms are described for automatically identifying and acting upon conditions which indicate that a list content density should be adjusted to promote effective and enjoyable use of a graphical user interface. For example, when a dimension of a display area reaches a predefined threshold, content density is automatically adjusted by changing the size of displayed list items, the number of displayed list items, the navigation format used to display the list items, or a combination of these characteristics. Other technical activities pertinent to teachings herein will also become apparent to those of skill in the art.

Some examples provided herein are directed to automatically rebalancing the content density components of a list of graphical items when the area that is available to display items from the list changes dynamically. The available area may change, for instance, when a window is resized, when a graphical user interface switches between portrait and landscape mode, or when the displayed content is moved from one hardware screen to another hardware screen on the same or a different device. Examples are discussed which identify these adjustment conditions and specify content density adjustments to be made in response to a given condition.

In some embodiments, a list display controller controls a processor to monitor a display subsystem to detect a display area portion change which alters the width or height of a display area portion, e.g., the portion available to display a list of graphical items. The list display controller automatically disables scrolling of displayed items along a visual orientation when a predetermined dimension of the display area portion along the visual orientation exceeds a predetermined threshold, and otherwise the list display controller automatically enables such scrolling. As a result, in some embodiments the list is automatically displayed in a scrolling format on smaller screens such as a phone screen or a small tablet screen and the list is displayed in a fixed format on larger screens such as a workstation, video game system, or television screen. The precise transition point between scrolling and fixed formats may vary according to the particular example, e.g., some examples may use scrolling only on tablets and phones while other examples use scrolling only on phones.

Transitioning between scrolling and fixed formats may include automatically relocating at least a portion of the graphical content of the list items. For instance, in a scrolling-to-fixed format transition, some graphical content (which before the format transition was not displayed but was available for display in the horizontal scroll format) is newly displayed after the format transition in the fixed format. Also, in a fixed-to-scrolling format transition, some graphical content which before the format transition was displayed in the fixed format is not displayed after the format transition, but is available for display in the scroll format by scrolling to it.

Some embodiments continuously resize displayed graphical items as the display area is resized. As the display area grows or shrinks, the size of the displayed graphical items keeps pace by growing or shrinking in proportion, to maintain the same ratio (or the same ratio within a predefined tolerance) of graphical item size to display area size.

Some embodiments transition from one fixed format to another as the display area changes. As the display area grows or shrinks, the number of graphical items displayed keeps pace by growing or shrinking. For instance, if a tablet displays M items in fixed format in a GUI on a laptop, then moving the GUI to a video game system may cause a transition to a fixed format displaying N items, where N is larger than M. In some embodiments, as a display area containing the displayed graphical items is continuously resized, the embodiment continuously resizes the displayed graphical items in a fixed format having J graphical items displayed and then as the display area continues being resized the embodiment displays the displayed graphical items in a fixed format having K graphical items displayed, with J and K being different positive integers.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
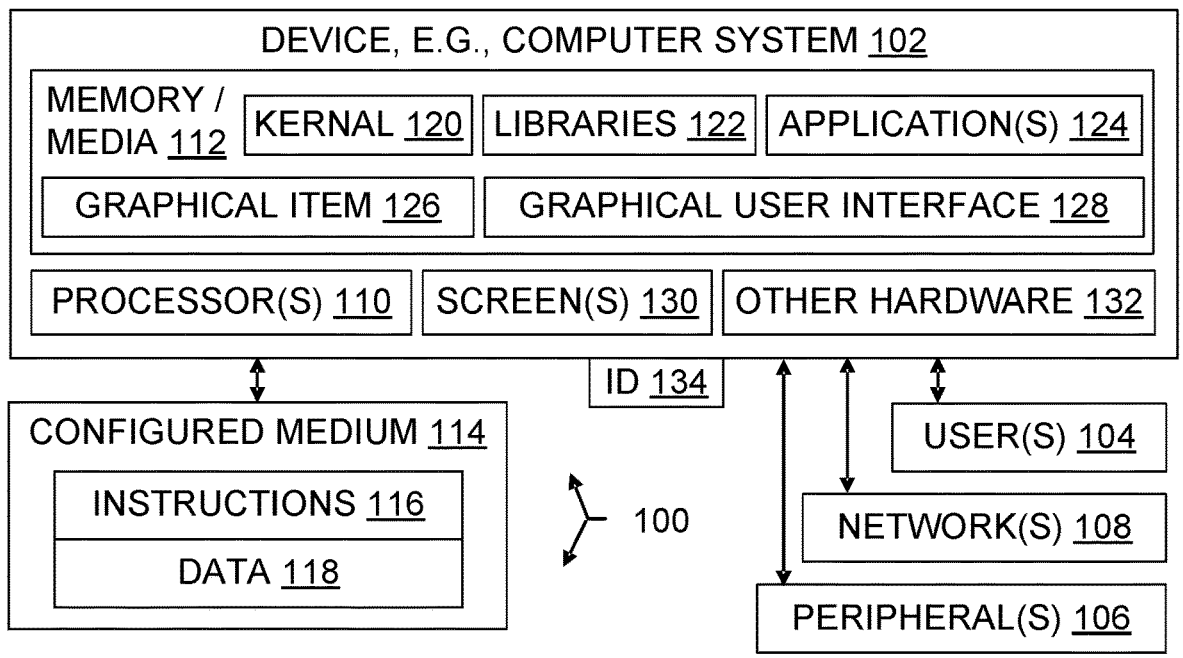
FIG. 1 is a block diagram illustrating a computer system having at least one processor, at least one display screen, and at least one memory which interact with one another under the control of graphical user interface software, and also illustrating a configured storage medium.

Conventionally, app developers targeting different platforms and screen sizes had to write custom logic to adapt their user interface to various screen sizes while worrying about how to achieve desired content density and usage patterns. For instance, one conventional approach has been to write separate controls targeting different "form factors" while duplicating much of the code for different screen sizes across the form factors. As used here, a "form factor" is a device type, a screen display area size, or both. But code duplication increases the work required to implement and distribute bug fixes or other updates to the code.

Another conventional approach has been to wrap graphical contents under a scroll viewer which adjusts to the available screen width. Then whatever number of items fully or partially fit within the available width are shown, while others must be scrolled into view. On a phone, scrolling may be convenient and be an effective use of the small available display area. But use of scrolled lists degrades user experience in situations where there is significant distance between the user and the screen, e.g., in video game systems where content is scaled up for viewing from a distance of several meters (e.g., from ten feet away).

One insight underlying examples presented herein is that a graphical user interface (GUI) may itself effectively be data that travels between devices. By contrast, an email message carries text and image data between computing devices, but each device still has its own email application. The email does not adapt itself to the different devices on which it is written or read. Instead, each email application provides a user interface that is tailored to the device on which that email application runs. Similarly, word processor files, spreadsheet files, and many other kinds of files do not adapt themselves to different devices but are instead read by applications that are tailored to the devices in question. This approach has the advantage of making email, word processor, and the other file formats relatively simple and widely used. But one of the costs is that code for using files in those formats must be re-implemented on many different platforms.

Some web pages conform to a "responsive design" approach which lays out visual content based in part on the size of the screen the page will be rendered on, or based on a proxy of the screen size such as the kind of device the screen is in. For example, on a widescreen desktop monitor all of the responsive web page's content is shown, while on successively smaller screens (e.g., laptop, then tablet, then mobile phone) some of the page's content is moved from being displayed beside other content to a location below that content (thus increasing the vertical scrolling needed to view the moved content), and some of the page's content is not displayed at all on the smaller screen (regardless of scrolling). Thus, in hindsight, the kind of information which travels among computing devices has broadened, from substantive content alone such as email text and images, to substantive content plus information about the layout of that substantive content in a web browser.

However, there are many different kinds of visual content in addition to web pages and email, and there are many different ways one could change visual content layout for one screen or another. Moreover, there are few if any established guidelines with the precision required to help automate such layout changes in ways that promote efficient and enjoyable user experiences. The responsive web page design discussed above merely illustrates two of the many layout guidelines that are possible in view of the teachings herein. These two responsive web page design guidelines are: (i) when a screen becomes sufficiently narrower, reposition one or more pieces of web page content (which have been tagged or otherwise selected manually) from their side-by-side locations to over-under locations, and (ii) when a screen becomes sufficiently narrower, omit from view web page content that has been tagged or otherwise selected manually to be omitted. These guidelines have some value, and they can be applied together with other guidelines. But the present teachings go well beyond responsive web page design and these two guidelines.

The inventors realized that different devices benefit from different approaches to content density, based on screen size and usage patterns for the different kinds of input the device can accept. For instance, for a smartphone layout it makes sense to show less content on screen at a time while making that content big enough for a user to readily process it. Accordingly, a scrolling list of content items works well. Many phones support touch based input, which also works well to control scrolling.

On the other hand, some wider layouts, on devices such as a tablet, PC (personal computer, e.g., workstation or laptop), Xbox® device, or Surface Hub™ device, have sufficient real estate to show more content (marks of Microsoft Corporation). Accordingly, with these devices a fixed list of content items is more suitable, particularly when a mouse is used to select items.

On Xbox® devices and some other video game systems, and in some virtual reality devices such as HoloLens™ devices, too many scrolling lists on a given page or view could degrade the user experience (marks of Microsoft Corporation). Accordingly, such systems can be configured to show fewer items of content but show those items scaled so that a user can view them clearly and process them from an actual distance or a perceived apparent distance of several meters.

In addition, some technologies such as the Microsoft Continuum™ technology permit movement of an application's graphical user interface between different devices while the application is running, e.g., from a phone screen to a PC screen. Accordingly, it is helpful to have guidelines for adapting a list display format to each of a sequence of currently used screen sizes, even mid-execution, in order to improve user experience, whether as part of a Universal Windows Platform (UWP) technology or otherwise.

Several format guidelines for automatic layout changes are presented and discussed herein, with a kind of content density as an organizing principle. In particular, a visual layout characteristic called "list content density" is described and applied as a metric of efficiency and of the likelihood of a positive user experience when viewing or navigating a list of graphical items within a graphical user interface. Making adjustments to maintain a high list content density, or to maintain a consistent list content density across screens or resizes, or to do both, tends to improve users' experiences when viewing and navigating lists of graphical items. Likewise, making adjustments to match content density to a particular kind of device (phone, tablet, laptop, television, etc.) can help make the user's experience of lists consistent with the user's experience of other aspects of the graphical user interface, and thus more efficient and enjoyable.

Some of the format guidelines for automatic layout changes presented herein are: (a) when moving a GUI to a narrow screen such as a phone screen, use a scroll list format; (b) when moving a GUI from a narrow screen such as a phone screen to a wider screen, use a fixed list format; (c) when moving a GUI from a screen that uses a fixed list format to a wider screen, continue to use a fixed list format but add more slots so that more items are simultaneously displayed; (d) when changing the display area size available to show a list in a GUI but not changing screens, resize the list items proportionately to the new display area size; (e) when displaying list items on a page or view that can be dismissed from display as a single unit by the user, use a fixed format for the list items rather than a scroll format. Other format guidelines will be apparent to one of skill from the examples and discussions herein.

One implementation of suitable format guidelines includes a control which adapts list format to a narrow mode or to a 6, 8, 10 or 12 column mode based on the available screen size. The snap points (display area size thresholds) where the control switches its modes were chosen in part to provide desired list content density. Modes with an even number of fixed format slots are also used, to facilitate double-wide list items. On smaller screens like a tablet screen the control shows six items in a list, while on a high resolution screen it shows twelve items. Each item in the list is given equal space to render itself, thus filling up the screen display area evenly along the horizontal orientation. In response to changes to screen display area size in between the 6, 8, 10 or 12 column mode snap points, the control scales the content item up or down in size while maintaining its aspect ratio, thus giving a smooth visual experience to the user. Any extra pixels not used to display an item's graphical content is distributed across each item's display area as part of the padding around the items. This responsive rendering logic has been implemented using XAML in a GUI control which takes in a list of items and displays it based on the screen size and format guidelines, thus powering the experience across multiple device platforms with a single code base. This can be a handy control for apps developers who target varied devices.

Some embodiments described herein may be viewed in a broader context. For instance, concepts such as density, lists, resizing, and scrolling may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving density, lists, resizing, or scrolling are outside the present scope. Accordingly, vagueness, mere abstractness, lack of technical character, and accompanying proof problems are also avoided under a proper understanding of the present disclosure.

The technical character of embodiments described herein will be apparent to one of ordinary skill in the art, and will also be apparent in several ways to a wide range of attentive readers. First, some embodiments address technical activities that are rooted in computing technology, such as allocating screen space to graphical items for display, determining when a change in display area size should cause a change in the layout of a display, and determining what that change should be in terms of slot count and scrollability. Second, some embodiments include technical components such as computing hardware which interacts with software in a manner beyond the typical interactions within a general purpose computer. For example, in addition to normal interaction such as memory allocation in general, memory reads and write in general, instruction execution in general, and some sort of I/O, some embodiments described herein monitor particular computing conditions such as a display area size and the number of slots available to display graphical items. Third, technical effects provided by some embodiments include efficient adherence to list content density goals and automatic conformance of a GUI to an expected usage pattern for a given kind of computing device. Fourth, some embodiments include technical adaptations such as code implementing GUI adjustment or other format guidelines based on screen display area size, code which enables or disables scrolling based on screen size, and snap points defining conditions for changing the number of display slots that are used in a fixed format presentation of graphical items. Fifth, technical advantages of some embodiments include improved GUI usability by virtue of greater continuity in list content density as display area size changes, and improved efficiency in computing resource and developer effort allocations by virtue of covering more platforms with a single list display controller code base. Other advantages will also be apparent to one of skill from the description provided.

Acronyms and Abbreviations

Some acronyms and abbreviations are defined below. Others may be defined elsewhere herein or require no definition to be understood by one of skill.

ALU: arithmetic and logic unit
API: application program interface
APP: application
CD: compact disc
CPU: central processing unit
CSS: cascading style sheet
DVD: digital versatile disk or digital video disc
FPGA: field-programmable gate array
FPU: floating point processing unit
GPU: graphical processing unit
GUI: graphical user interface
IDE: integrated development environment, sometimes also called "interactive development environment"
OS: operating system RAM: random access memory
ROM: read only memory
XAML: extensible application markup language Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry. In particular, although it may occur that many embodiments run on server computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

"Routine" means a function, a procedure, an exception handler, an interrupt handler, or another block of instructions which receives control via a jump and a context save. A context save pushes a return address on a stack or otherwise saves the return address, and may also save register contents to be restored upon return from the routine.

"Service" means a program in a cloud computing environment.

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance; (g) embedment in an implanted medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, or physical transportation system monitoring.

As used herein, "content density" is the amount of list item content displayed in an area relative to the size of the area which is available to display such content. The "amount of list item content displayed" may be quantified, e.g., in terms of the number of pixels showing list item content and the number of different list items whose content is being shown. The ease with which a user can access an item may also impact content density. Qualitatively, content density is highest when the largest number of graphical items from a list are displayed in a legible and easily accessible format which uses all of the screen area that is currently available to display the list's graphical items. Lowering the number of graphical items displayed reduces content density even if all currently available area is still used. Leaving currently available display area unused for display of the list's graphical items also lowers the content density.

"Scrolling", "scrollable", and "scroll" format refer to a format in which items of a list appear to be arranged on a tape, loop, sphere, or other surface viewed through a window or aperture which allows only a subset of the items to be seen (and thus individually selected) at a given time, and which can be moved by user input to show different items through the aperture.

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Optimize" means to improve, not necessarily to perfect. For example, it may be possible to make further improvements in a program or an algorithm which has been optimized.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as detecting changes in display area size, enabling or disabling scrolling, resizing graphical items, and controlling list display format based on a current display area dimension, are understood herein as requiring and providing speed and accuracy that are not obtainable by human mental steps, in addition to their inherently digital nature. This is understood by persons of skill in the art but others may sometimes need to be informed or reminded of that fact.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Linguistically" means by using a natural language or another form of communication which is often employed in face-to-face human-to-human communication. Communicating linguistically includes, for example, speaking, typing, or gesturing with one's fingers, hands, face, and/or body.

Throughout this document, use of the optional plural "(s)", "(es)", or "(ies)" means that one or more of the indicated feature is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/ Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as altering, changing, comparing, controlling, detecting, disabling, displaying, enabling, identifying, monitoring, relocating, resizing, scrolling, specifying, transitioning, using (and alters, altered, changes, changed, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave outside the scope of patentable subject matter under United States Patent and Trademark Office (USPTO) interpretation of the In re Nuijten case. No claim covers a signal per se in the United States, and any claim interpretation that asserts otherwise is unreasonable on its face. Unless expressly stated otherwise in a claim granted outside the United States, a claim does not cover a signal per se.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as computational system or computing system
104 users
106 peripherals
108 network
110 processor
112 computer-readable storage medium, e.g., RAM, hard disks
114 removable configured computer-readable storage medium
116 instructions executable with processor
118 data
120 kernel(s), e.g., operating system(s), BIOS, device drivers
122 software library or libraries
124 application software, e.g., apps, browsers, interactive web pages
126 graphical item
128 graphical user interface
130 display screens, monitors, displays
132 system hardware in addition to processor and memory
134 device kind identifier
200 phone, e.g., smartphone
202 display area
204 graphical content of graphical item
206 row of graphical items
208 edge of display area
210 visual orientation
300 padding (horizontal, vertical, or both) around graphical content
400 tablet
402 display slot in fixed format
404 displayed page in GUI
500 video gaming system
502 window
600 high resolution large screen system
700 double-wide graphical item
800 display subsystem
802 display area width
804 display area height
806 list display controller
808 display mode, e.g., portrait or landscape
810 current list display format
812 list display format transition condition(s)
814 list display controller code
816 list display formats, e.g., scrollable, 6-slot fixed, 8-slot fixed, . . .
900 graphical item properties, e.g., current width and height
902 minimum display width of graphical item
904 list of graphical items, e.g., linked list, set, bag, collection, group
1000 list display format template(s)
1002 list display format transition value(s), e.g., device kind identifiers, or width(s) in pixels or other units, (widths are a.k.a. snap points)
1004 tolerance for comparing actual display width to snap point 1006 current condition, e.g., current display area width
1008 current number of items displayed, e.g., number of slots in currently used fixed format, or special value to indicate scrolling is enabled
1010 list content density according to one of the definitions herein
1100 first flowchart
1102 displaying graphical item by display at least part of its content
1104 monitoring display area for change in width, other dimension, or device kind
1106 detecting satisfaction of a format transition condition
1108 relocating graphical content
1110 change format, i.e., transition between scroll and fixed format or transition between fixed M-slot and fixed N-slot format
1112 change visibility of content
1114 visibility to user of content
1116 resize item, i.e., resize displayed content of item
1118 enable scroll format (disables fixed format)
1120 disable scroll format (enables fixed format)
1122 scrolling through row of contents of graphical items
1124 change number of display slots in fixed format
1128 resize a window in GUI
1132 change between landscape and portrait mode
1134 relocate graphical content to another hardware screen
1136 detect a change in the number of items displayed
1138 use display area width (portion allocated to row) within a specified tolerance of snap point as a format transition trigger
1142 change between scrollable and fixed format
1146 adjust list content density by changing format or resizing content or both
1148 change display area size
1150 view graphical item content
1152 select graphical item
1200 second flowchart
1202 decision point for testing if format transition condition is met
1204 updating display with reformatted graphical content
1206 updating display with resized graphical content in current format Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 130 may be a removable peripheral 106 or may be an integral part of the system 102. A user interface may support interaction between an embodiment and one or more human users. A user interface may include a command line interface, a graphical user interface (GUI) 128, natural user interface (NUI), voice command interface, and/or other user interface (UI) presentations, which may be presented as distinct options or may be integrated. A GUI may include integrated NUI or voice command functionality, for example. A GUI 128 may be generated on a local desktop computer, or on a smart phone, for example, or it may be generated from a web server and sent to a client device 102. The GUI 128 may be generated as part of a service and it may be integrated with other services, such as social networking services. The GUI presents graphical items 126 such as thumbnails, keyframes, app icons, document icons, other file icons, and desktop icons, which a user may view 1150 and select 1152 using the GUI. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se under any claim pending or granted in the United States.

The medium 114 is configured with binary instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 132 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example. A value indicating what kind of device (e.g., smartwatch, smartphone, phablet, tablet, laptop, television, game system, etc.) a given device is, may be explicitly stated or implicitly derivable from one or more IDs 134, which are typically embedded in devices 102 by their manufacturers.

In addition to processors 110 (CPUs, ALUs, FPUs, and/or GPUs), memory/storage media 112, and displays 130, an operating environment may also include other hardware 132, such as batteries, buses, power supplies, wired and wireless network interface cards, for instance. The nouns "screen" and "display" are used interchangeably herein. A display 130 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory. Software processes may be users 104.

In some embodiments, the system includes multiple computers connected by a network 108. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

Systems

Figure 5:
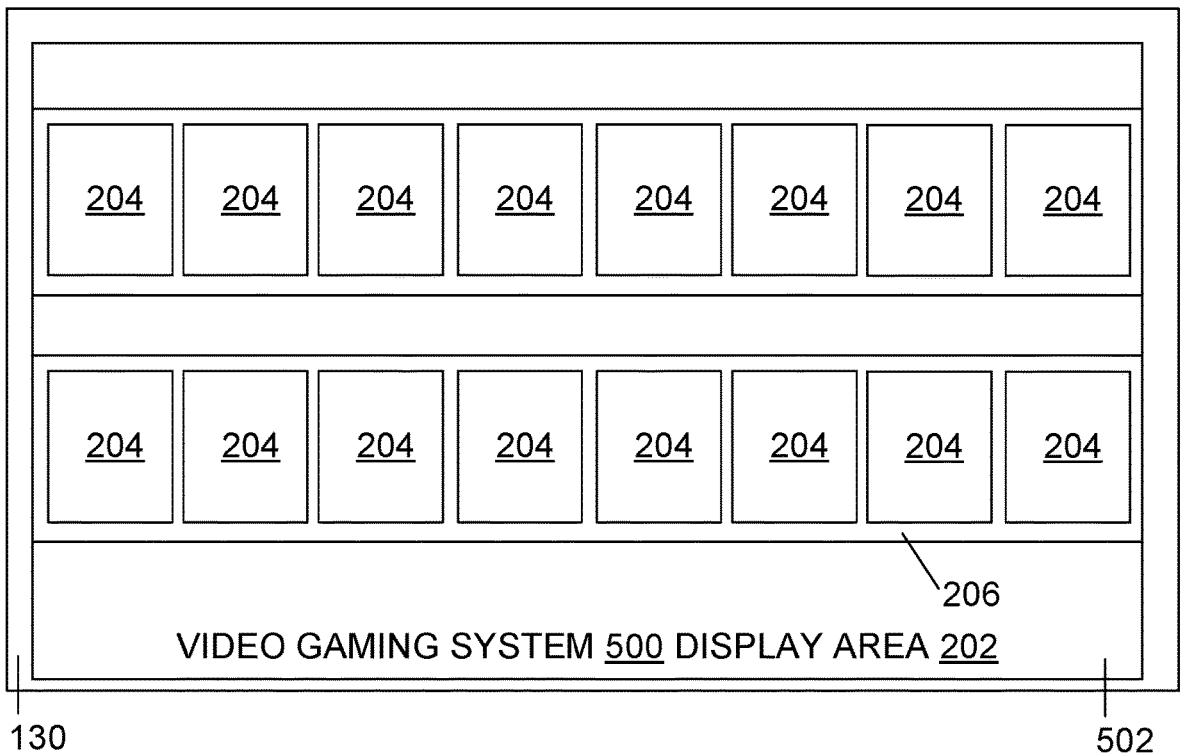
FIG. 5 is a diagram illustrating graphical items displayed on a video game system screen in an eight-slot fixed format.
Figure 6:
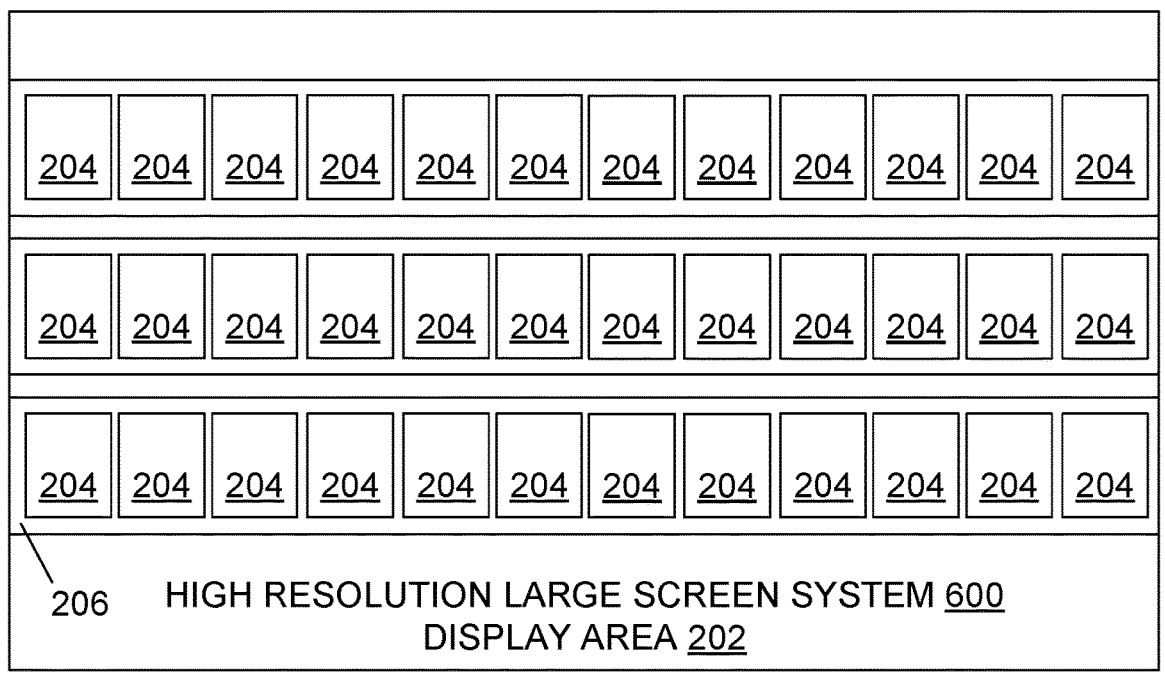
FIG. 6 is a diagram illustrating graphical items displayed on a high resolution large screen in a twelve-slot fixed format.
Figure 7:
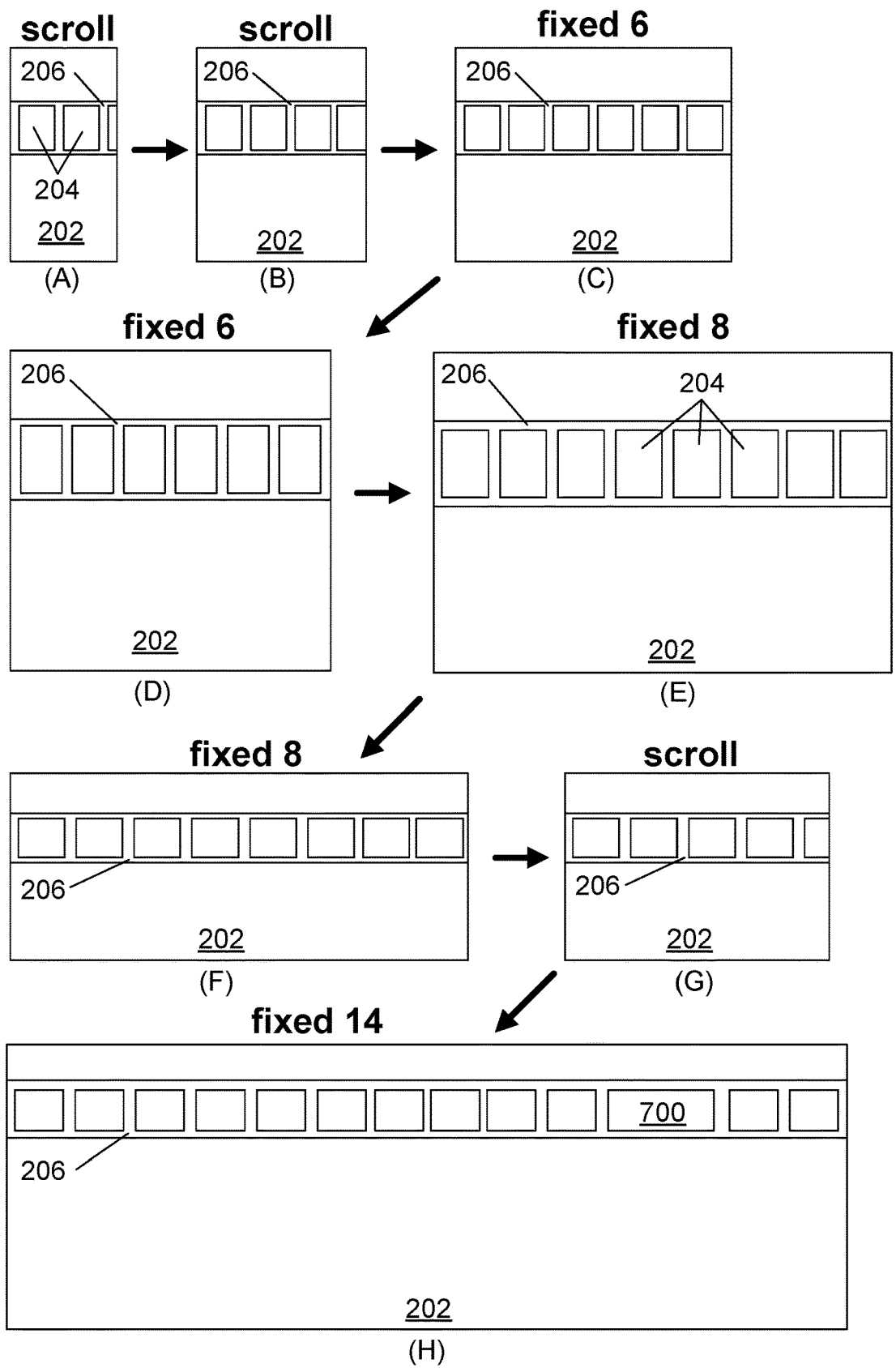
FIG. 7 is a diagram illustrating a sequence of changes in display area and corresponding changes in list content density.
Figure 11:
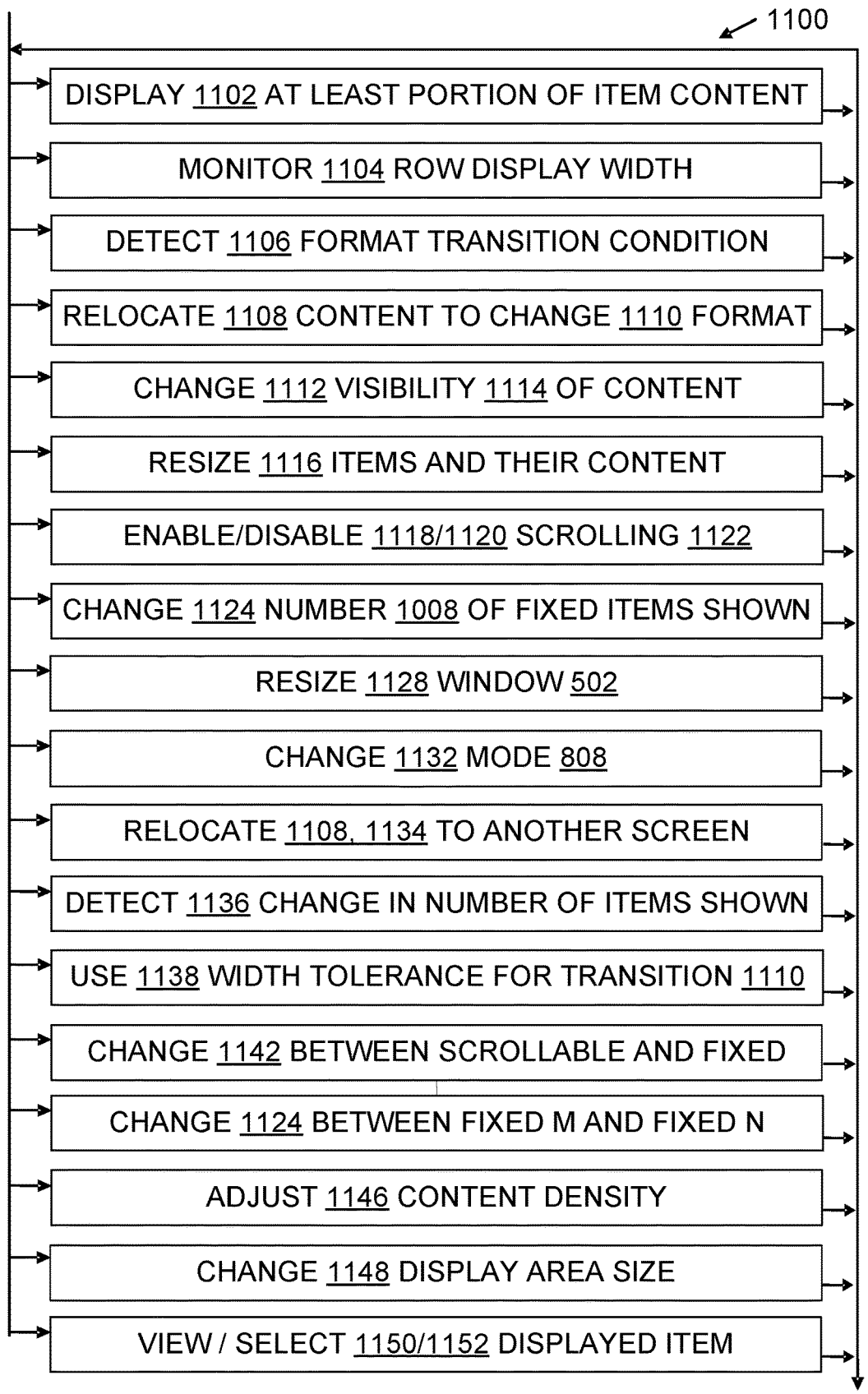
FIG. 11 is a flow chart illustrating aspects of some processes and configured storage media for adjusting list content density.
Figure 12:
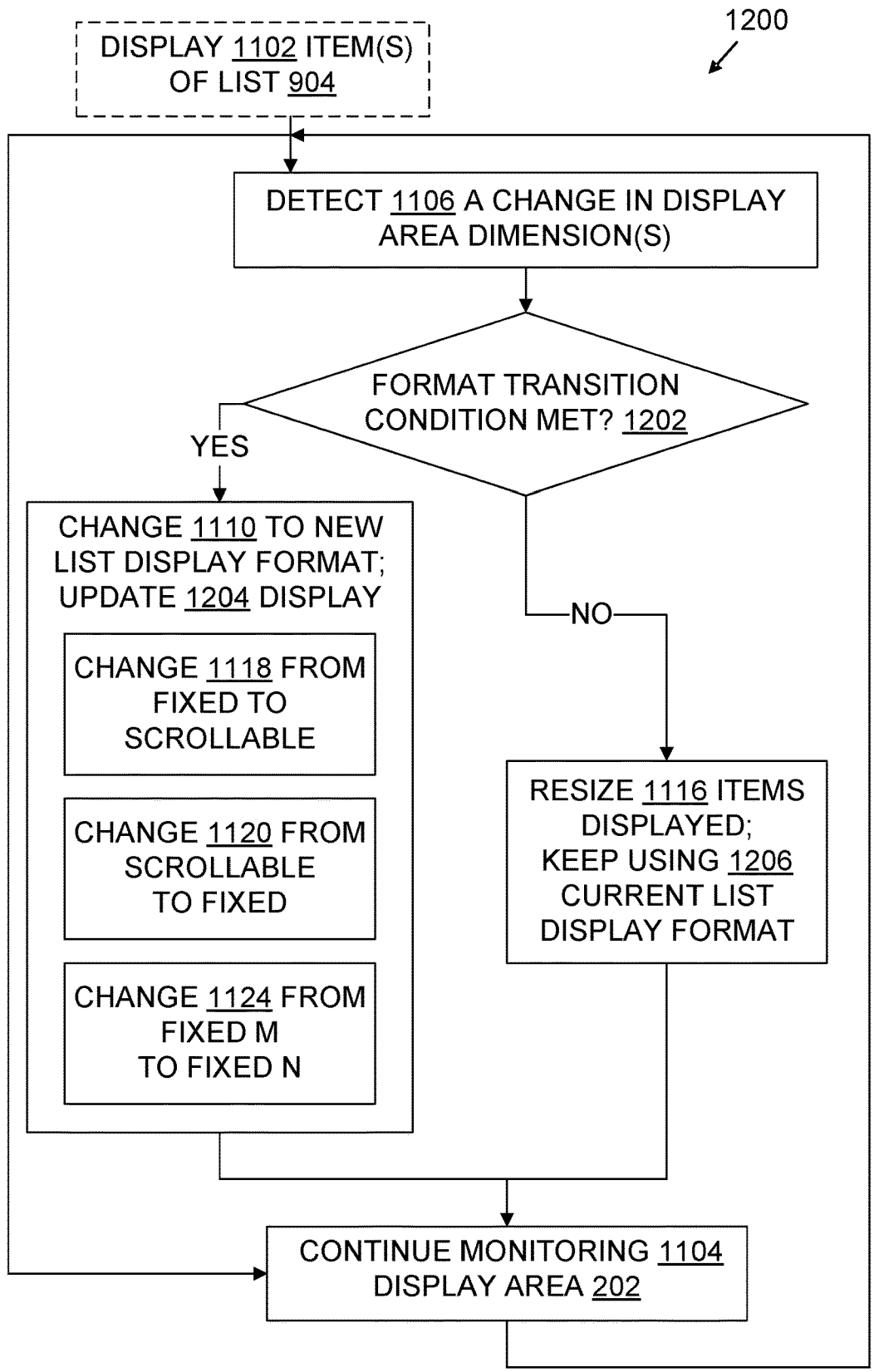
FIG. 12 is flow chart further illustrating aspects of some process and configured storage medium embodiments for adjusting list content density.

FIGS. 1 through 10 illustrate some of the systems, including some of the devices 102, which conform with teachings presented herein. FIGS. 7, 11 and 12 illustrate operation of such systems 102.

Figure 2:
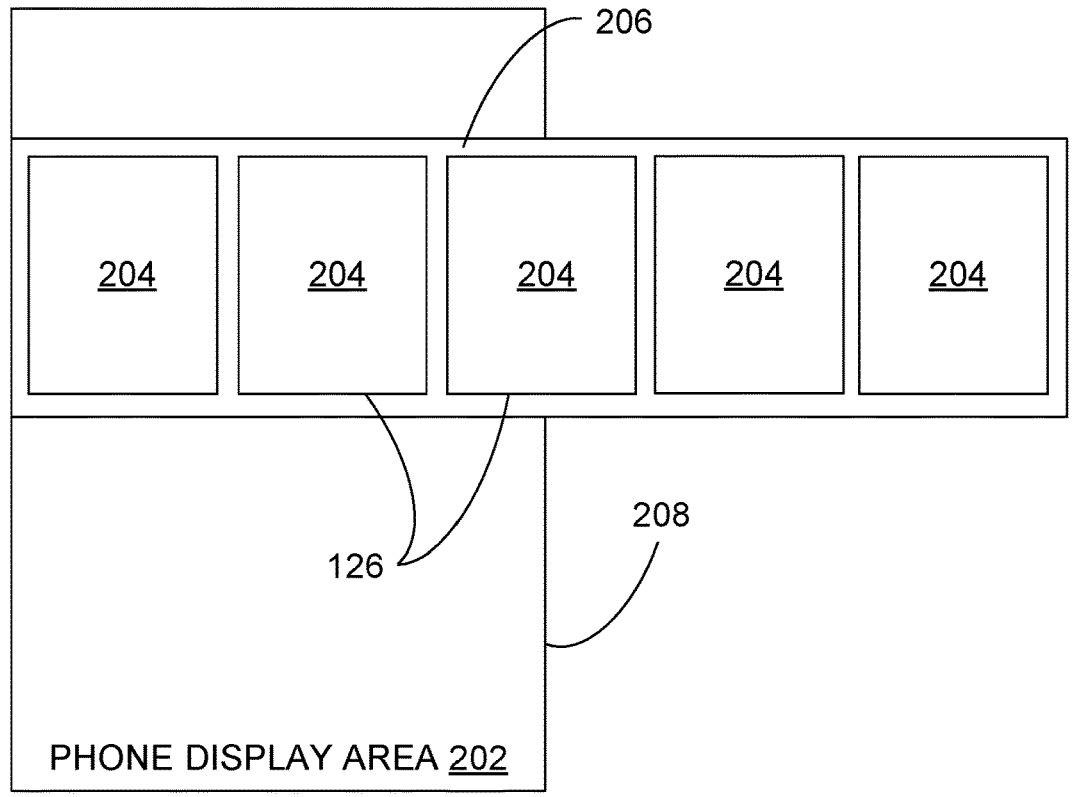
FIG. 2 is a diagram illustrating components of an example computing architecture, showing a list of graphical items conceptually superimposed on a phone screen.

FIG. 2 shows a sample environment 100 in which the computer system 102 is a smartphone 200. For clarity of illustration, the processor(s) 110 and other hardware 132 such as a power connector, power button, microphone, speaker, and housing are not explicitly shown. The phone 200 includes a screen 130 which has a display area 202; for clarity of illustration, the screen and its display area are represented in FIG. 2 by the rectangle labeled 202. The outer edge of the display area is labeled 208. The phone 200 also includes memory which contains graphical items 126; for clarity of illustration, the memory and the graphical items are represented in FIG. 2 by rectangles which have interiors labeled 204. Label 204 indicates graphical content of respective graphical items. The graphical items are arranged in a row 206.

Figure 3:
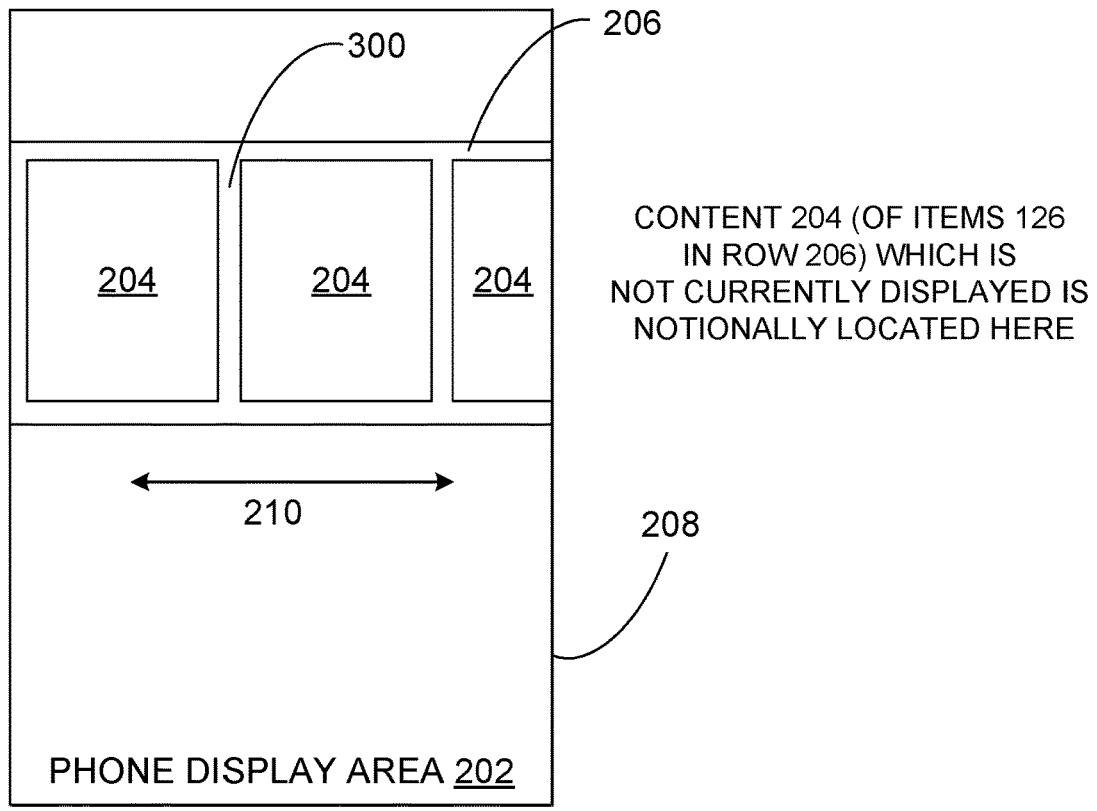
FIG. 3 is a diagram illustrating an implementation using the components of FIG. 2, with the list of graphical items partially displayed in a horizontal scroll format.

FIG. 2 shows a conceptual arrangement, with the row 206 of graphical items 126 superimposed on the display area 202. This is one way a user or developer may think of the graphical items' location, namely, as being arranged in a row which extends beyond the display area. In an augmented reality or holographic projection system, the row 206 may actually appear as illustrated in FIG. 2. But in most smartphones, only a part of the row 206 will be visible at a time, as illustrated in FIG. 3. The rest of the row 206 can be made visible by scrolling, to move currently unseen graphical content 204 into view on the display area 202.

Figure 4:
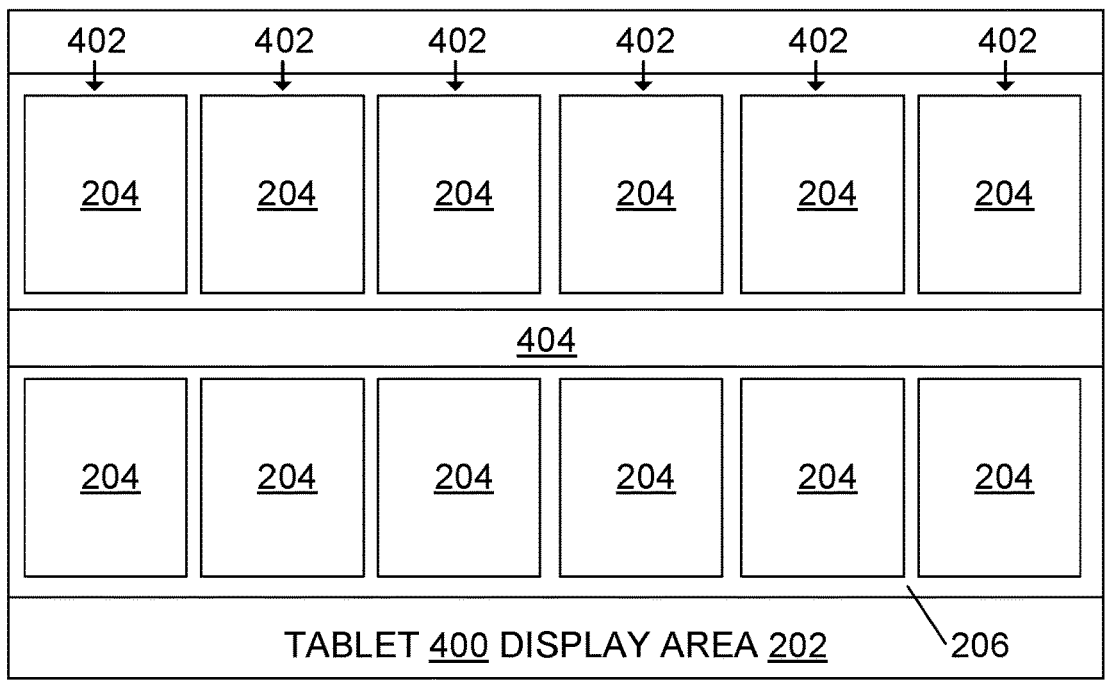
FIG. 4 is a diagram illustrating graphical items displayed on a tablet screen in a six-slot fixed format.

In contrast with the horizontal scroll format shown in FIG. 3, a fixed format is shown in FIG. 4 on a tablet 400 display area. The particular fixed format in FIG. 4 has six display slots indicated at 402, but other fixed formats may anywhere from two to an arbitrarily large positive integer number of display slots. FIG. 5 shows an eight-slot fixed format on a video gaming system 500 display area 202 in a window 502, and FIG. 6 shows a twelve-slot fixed format on a high resolution large screen system 600 display area 202. As suggested by the Figures and hereby confirmed, different examples may have a different number of rows; FIGS. 4 and 5 show two rows while FIG. 6 shows three rows. Although a window 502 is explicitly labeled only in FIG. 5, one of skill will understand that windows may be used on a wide variety of devices 102 in addition to video game systems, consistent with the teachings herein.

FIG. 7 illustrates format transitions which occur in response to display area size changes pursuant to format guidelines such as those presented above in the overview. This example begins in FIG. 7A with a narrow display area 202 which has a horizontal scroll format for presenting graphical item content 204 of items arranged in a row 206. In a given implementation, the display area may be considered "narrow" because it is on a smartphone, or because it is less than a predetermined multiple of a minimal width in pixels of a graphical item, for instance, or because it is less than specified number of pixels wide. Pixel width may be measured in physical pixels or in virtual pixels, e.g., CSS pixels (denoted px). The specific number of pixels marking the edge of "narrow" may vary from one implementation to another, but the behavior and use of format guidelines will show one of skill whether the teachings herein have been adopted and applied.

In FIG. 7B, the display area 202 is wider than in FIG. 7A, but is still sufficiently narrow that the format in use is still a horizontal scroll format.

In FIG. 7C, the display area 202 is wider than this example's definition of "narrow" and as a result the horizontal scroll format is no longer in use. FIG. 7C shows a six-slot fixed format in use for presenting graphical item content from a list of six or more graphical items.

In FIG. 7D, the display area 202 is both wider and taller than in FIG. 7C. However, the width increase is not enough to reach a snap point for transitioning to a fixed format with more than six slots, so content 204 is still shown only for six graphical items. The graphical content that is shown has been resized larger to use some of the additional display area 202 that became available when the display area 202 grew wider and taller. In some implementations, such resizing preserves the aspect ratio of the graphical content, while in others it does not.

In FIG. 7E, the display area 202 is wider than in FIG. 7D, and the width has crossed a snap point for eight-slots, so the format transitioned from the six-slot fixed format in 7D to an eight-slot fixed format in 7E.

In FIG. 7F, the display area 202 has the same width as in FIG. 7E, so an eight-slot fixed format is still used. However, the display area 202 has shortened, so the graphical content has been resized to be shorter. Whether this resizing preserves the aspect ratio depends on the implementation.

In FIG. 7G, the display area 202 is narrower than in FIG. 7F, and has crossed a snap point for a minimum number of slots, so the format transitioned from the eight-slot fixed format to a scroll format.

In FIG. 7H, the display area 202 is both wider and taller than in FIG. 7G, and has crossed a snap point for fourteen slots, so the format transitioned from the scroll format to a fourteen-slot slot fixed format. The graphical content shown has also been resized larger to use some of the additional display area 202 that became available when the display area 202 grew taller. Whether this resizing preserves the aspect ratio depends on the implementation. One of the graphical items, indicated at 700, is a double-wide item, namely, one whose graphical content occupies two display slots.

Figure 8:
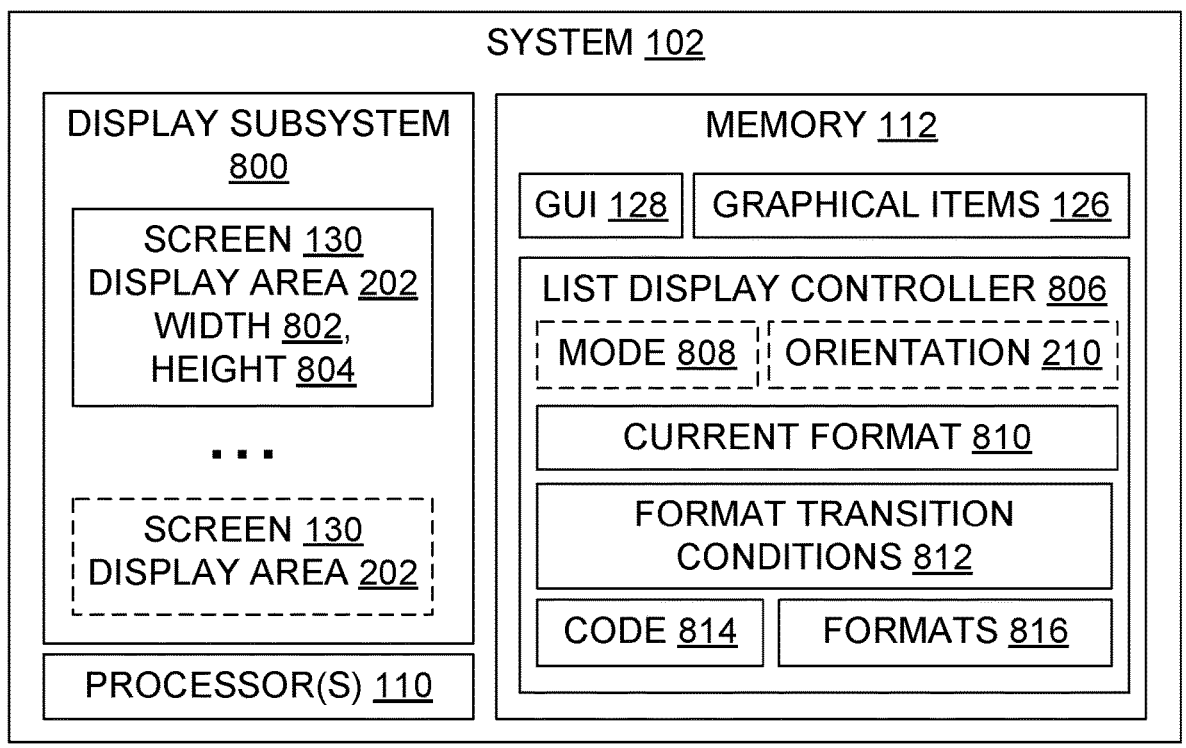
FIG. 8 is a block diagram illustrating a system having at least one processor, a display subsystem with at least one display screen, a memory, a list display controller, a list of graphical items, and other components.
Figure 9:
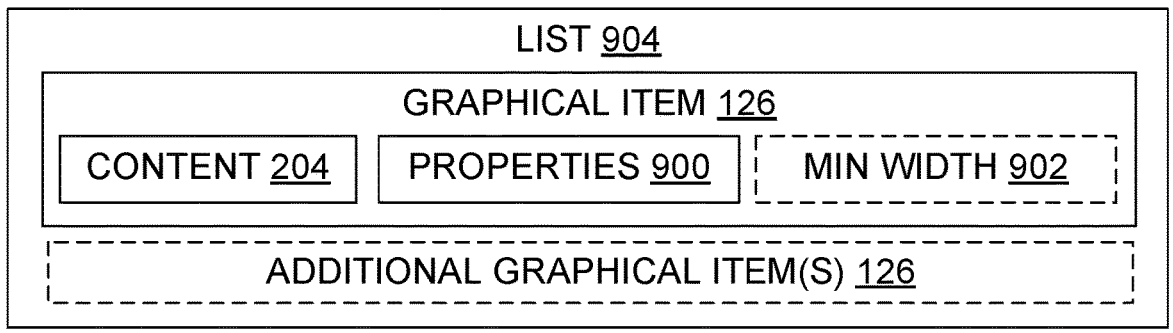
FIG. 9 is a diagram further illustrating a graphical item of FIG. 8.
Figure 10:
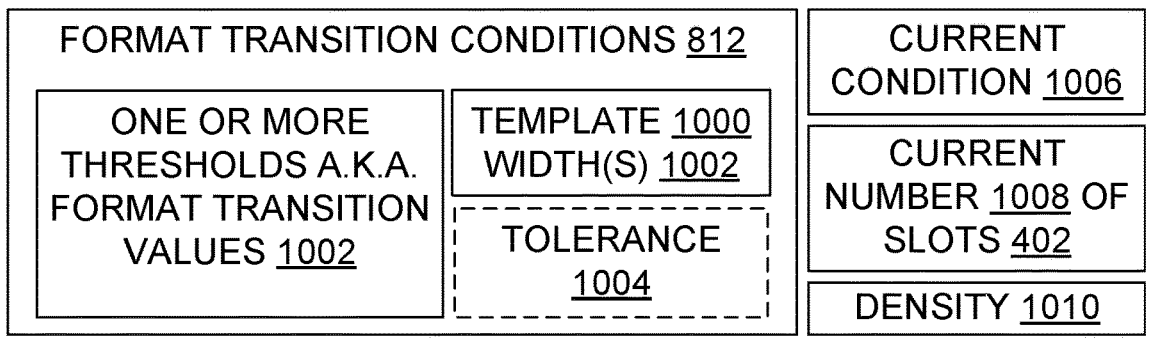
FIG. 10 is a diagram further illustrating format transition conditions of FIG. 8 and other aspects of some systems.

FIGS. 8, 9, and 10 further illustrate aspects of some systems 102. A display subsystem 800 includes one or more hardware screens 130. Each screen 130 has a display area 202, which has dimensions. Since display areas are generally rectangular, particularly when displaying a row of graphical item contents, dimensions such as width 802 and height 804 are generally apparent to a user 104. However, a row or column of graphical item contents may also be displayed with format selections as taught herein in display areas 202 which are not generally rectangular, such as round, oval, polygonal other than rectangular, irregularly shaped, or three-dimensional surface display areas 202. A non-rectangular display area 202 may also have a width and a height which pertain to the display of graphical item contents, and therefore be formatted in according with the teachings herein.

Systems may be combined to form larger systems. A system 102 may include one or more individual devices 102, so a display subsystem 800 may include one or more hardware screens 130. For example, a single-screen system 102 may consist of a smartphone 200 configured to operate as described herein, e.g., to transition between a scroll format and one or more fixed formats in response to dimensional changes in a window which serves as a display area 202 on the phone 200. In this example the display subsystem 800 includes the phone screen. A double-screen system may consist of a smartphone 200 and a large (e.g., at least eighteen inches diagonally) screen with an attached desktop computer, configured to operate as described herein, e.g., to transition between a scroll format and one or more fixed formats in response to changes in which screen is used (partially or fully) to show a display area 202. In this example the display subsystem 800 includes the phone screen and the large screen. A triple-screen system may consist of a tablet 400, a laptop, and a video game system 500, configured to operate as described herein, e.g., to transition between one or more fixed formats in response to changes in which screen is used (partially or fully) for a display area 202. In this example the display subsystem 800 includes the tablet screen, the laptop screen, and the video game system screen.

The foregoing are merely illustrative examples. Many other device combinations are possible when forming a system 102, and the teachings herein can be applied to these other systems 102 as well. Each of the phone, tablet, laptop, video game system, and desktop computer is individually an example of a device or system 102. Functionally joined individual devices, such as a phone and a television, or a phone and a laptop and a video gaming system, are also examples of a system 102. The number of individual devices in given system 102 will be apparent to one of skill in the art.

FIG. 8 also shows a list display controller 806 as part of the system 102. The list display controller 806 may be implemented as part of the graphical user interface 128, or as part of a software library 122, or as part of a kernel 120, or as part of an application 124, or in a combination of two or more of the foregoing. The list display controller 806 may be implemented with a markup language such as XAML, with an interpreted programming language, with a compiled programming language, or in a combination of two or more of the foregoing. The list display controller 806 may be implemented in a model-view-controller architectural pattern, a presentation-abstraction-control architectural pattern, a model-view-presenter architectural pattern, or another architectural pattern.

The list display controller 806 implements in software (or in functionally equivalent hardware, or a combination of software and hardware) one or more of the format guidelines presented anywhere in the current disclosure. In situations which interpret a claim element as a means-plus-function, the list display controller may be viewed as a means for performing graphical item content presentation adherence to one or more of the format guidelines presented herein.

Regardless of whether means-plus-function interpretation applies, some of the suitable format guidelines include: (1) use a scroll list format to display a list of graphical items when the available display area is less than L times the minimum display width of a single graphical item, where L is a predetermined integer in the range from three to nine; (2) use a fixed format to display the graphical items when the available display area is greater than or equal to L times the minimum display width of a single graphical item; (3) use a set of two or more display area dimension snap points to determine how many display slots to use when displaying the graphical items in a fixed format; (4) when the display area dimension changes without crossing a snap point, resize the display graphical item content in response to the new display area size; (5) preserve aspect ratio when resizing graphical item content regardless of whether a snap point was crossed; (6) when displaying graphical item content on a page or view that can be dismissed from display as a single unit by the user, use a fixed format for the graphical item content rather than a scroll format even if the display area dimension would otherwise indicate use of a scroll format; this may disambiguate a scrolling gesture from a page dismissal gesture.

As illustrated, a list display controller 806 may have a mode 808, such as landscape mode or portrait mode.

As illustrated, a list display controller 806 may have a visual orientation 210. The most common visual orientation in GUIs which present content in English and other Indo-European languages is a horizontal orientation. A vertical visual orientation can be found in some content containing Chinese, Japanese, or Korean text. As a matter of graphic design, other visual orientations may also be used, regardless of the language, e.g., by presenting text which follows a spiral, a sinusoidal curve, or another path that is not a straight line.

As illustrated, a graphical item may have a minimum width 902 which is used when the item's content 204 is displayed. This minimum width 902 may be specified in CSS pixels, to be independent of screen resolution. A graphical item 126 will generally have other properties 900 as well, such as current width and height, links or pointers to other graphical items in a list of items 126, checksums, permissions, dimensions, file format, and encoding/decoding format.

The illustrated list display controller 806 has a current format 810, which is one of the multiple formats 816 implemented at least in part by code 814 in the list display controller 806. For example, the current format 810 may be a scroll format or a fixed format. The visual orientation 210 may be considered part of the format 810 in a given implementation. The number of display slots 402 may be considered part of a fixed format in a given implementation. In some implementations, the number of rows 206 displayed is considered part of the format 810.

The illustrated list display controller 806 has one or more format transition conditions 812. Each format transition condition 812 specifies one or more thresholds, snap points, template 1000 widths 1002, expressions involving display area dimension(s), or other values 1002, as well as specifying a format 816 to use when that value 1002 is satisfied. In some implementations, the format transition value 1002 is satisfied when a current condition 1006 such as display area width is within a specified tolerance 1004 of the value 1002.

For example, in some implementations a value 1002 is a device kind identifier 134, and format transition conditions 812 specify the following format selections:

When device_kind==phone use horizontal-scroll-format;
When device_kind==tablet use fixed-format with slots==6;
When device_kind==laptop use fixed-format with slots==8;
When device_kind==gaming system use fixed-format with slots==10;
When device_kind==projection TV system use fixed-format with slots==12;
Else query user to obtain format selection.

As another example, in some implementations a value 1002 is a display area width in CSS pixels, and format transition conditions 812 specify the following format selections:

When display_area_width<144px use horizontal-scroll-format;
When 144px<=display_area_width<232px use fixed-format with slots==6;
When 232px<=display_area_width use fixed-format with slots==8;
Else use fixed-format with slots==10.

The snap points 144px and 232px are merely examples; other snap points may be used in other implementations. This example using 144px and 232px is consistent with an implementation in which padding around each item's displayed content is 2px, so width per item==(screen size−((left+right padding around items)×number of items))/number of items. In a six-slot display, with screen size==144px, width per item==(144−((2+2)×6))/6==20px. If screen size grows but does not reach the next snap point 232px, then in this example displayed content grows uniformly to fill the available space while maintaining the aspect ratio. Thus, with screen size==150px, width per item==(150−((2+2)×6))/6==21px. Similarly, with screen size==151px, width per item==(151−((2+2)×6))/6==21px, but the extra pixel is added to one item or its padding, so the first item's width is 22px and the other five items are each 21px wide. At the eight-slot snap point, screen size==232px, so width per item==(232−((2+2)×8))/8==25px.

Some examples use or provide a system 102 with a screen 130, a list 904 of items 126 to display, a memory 112, a processor 110, a graphical user interface 128, and a list display controller 806. The "list" may be a linked list, a partially ordered set, a fully ordered set, a collection, or another group of items 126, possibly embedded in other data structures. The list display controller 806 enables or disables scrolling based on the size of a portion of the display area 202 that is available to show the list, that is, to show content of one or more items 126 of the list.

One example is a computational system 102 for dynamically adjusting content density 1010 by controlling whether a list displayed in a graphical user interface 128 is scrollable. The system includes a memory 112, a list 904 of graphical items 126 residing in the memory, a display subsystem 800, a processor 110 in operable communication with the memory and the display subsystem, and a list display controller 806. The display subsystem 800 has a hardware screen 130 with a display area 202. A portion (some or all) of the display area 202 is available through the graphical user interface 128 for displaying one or more of the graphical items in a list format. That is, the portion is not dedicated to the display of something else and is function and visible to a user if a user is present. The list format has a visual orientation 210 which is a vertical orientation or a horizontal orientation. The display area portion has dimensions which include a width and a height. The list display controller 806 controls the processor 110 to monitor the display subsystem 800 to detect a display area portion change which alters the width or height of the display area portion, and controls the processor 110 to automatically disable scrolling of displayed items along the visual orientation when a predetermined dimension of the display area portion along the visual orientation exceeds a predetermined threshold 1002, and controls the processor 110 to otherwise automatically enable such scrolling.

In some cases, scrolling is enabled when the display area is too small to hold six list items at a time, (or five, or four, etc.) and is disabled otherwise. That is, in some systems each of the graphical items 126 has a respective minimum size 902 along an axis parallel to the visual orientation 210. The predetermined threshold 1002 in these particular systems is a value which is not more than six times the smallest of the one or more minimum sizes.

In some cases, the list display controller 806 adapts the list format between a device 102 that enables scrolling and a device 102 that does not, e.g., between a phone and a tablet. That is, in some systems the display subsystem 800 includes at least one hardware screen 130 whose display area portion dimension exceeds the predetermined threshold 1002 and also includes at least one other hardware screen 130 whose display area portion dimension does not exceed the predetermined threshold 1002.

In some cases, the display subsystem 800 includes a hardware phone screen having a phone screen display area, and the display subsystem also comprises a hardware larger screen. The hardware larger screen has a larger screen display area, namely, one which is larger than the phone screen display area. "Larger" means larger in at least one dimension. The list display controller 806 controls the processor to transition from a horizontal scroll format as the list format on the hardware phone screen to a fixed format as the list format on the hardware larger screen.

In some cases, the list display controller 806 adapts the list format between at least three screen display sizes for fixed format (non-scrollable) display of the list 904. For instance, in some cases the display subsystem 800 includes at least three hardware screens 130 with respective display area portions 202 having different respective dimensions, and the list display controller 806 controls the processor 110 to display a different respective number 1008 of the graphical items at a time (i.e., a different number of display slots 402) on each respective hardware screen based on the respective dimensions of the hardware screens. In some cases, this is done without scrolling the displayed graphical items along the visual orientation on any of the three hardware screens; only fixed formats are used.

In some cases, the list display controller 806 automatically disables scrolling of displayed graphical items 126 along the visual orientation 210 when an entire displayed page 404 of the graphical items can be swiped from display as a unit by a user command directed to the list display controller.

In some cases, the visual orientation 210 is a horizontal orientation. In some of these, the list display controller 806 compares the display area portion width 802 to at least one template 1000 width 1002 of a group of at least three different template widths, which are also referred to herein as "snap points". The list display controller identifies the largest template width which fits within the display area portion width. Then the list display controller specifies a number 1008 of the graphical items to display (number of slots 402) in a fixed format row in the display area portion, based on the identified template width. This implements behaviors such as those illustrated in the transition from FIG. 7D to 7E and FIG. 5 to FIG. 6, for instance.

In some cases, the display subsystem 800 includes a phone 200 screen 130 and also includes at least one of the following hardware screens 130: a tablet 400 screen, a laptop screen, a game system 500 screen, a television screen, or a hardware screen which has at least four times as much display area (in CSS pixels) as the phone screen.

Processes

Examples are provided herein to help illustrate aspects of the technology, but the examples given within this document do not describe all of the possible embodiments. Embodiments are not limited to the specific implementations, arrangements, displays, features, approaches, or scenarios provided herein. A given embodiment may include additional or different technical features, mechanisms, sequences, or data structures, for instance, and may otherwise depart from the examples provided herein.

FIG. 11 illustrates some process embodiments in a flowchart 1100. Technical processes shown in the Figures or otherwise disclosed will be performed automatically, e.g., by a list display controller 806, unless otherwise indicated. Processes may also be performed in part automatically and in part manually to the extent action by a human administrator or other human person is implicated, e.g., a person may command the resizing of a window or command the movement of a GUI from one hardware screen to another hardware screen. No process contemplated as innovative herein is entirely manual. In a given embodiment zero or more illustrated steps of a process may be repeated, perhaps with different parameters or data to operate on. Steps in an embodiment may also be done in a different order than the top-to-bottom order that is laid out in FIG. 11. Steps may be performed serially, in a partially overlapping manner, or fully in parallel. The order in which flowchart 1100 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Some embodiments use or provide a computer-implemented method for dynamically adjusting 1146 content density 1010 by relocating graphical content 204 within an underlying row 206 displayed in a graphical user interface 128. The "row" in such a method is a portion of the display area 202 which contains graphical content 204 and may contain padding 300. The method displays 1102 graphical content 204 of a first graphical item in a first format 816 in a displayed portion of the row within the graphical user interface on a first hardware screen 130 of a first computing device. The method also displays 1102 at least a portion of graphical content 204 of at least one additional graphical item in the first format in the displayed portion of the row within the graphical user interface. Display 1102 may be accomplished using rasterization, ray tracing, compositing, filtering, and other familiar techniques and tools which render photographs, computer graphics, or other graphical content to a screen 130.

The method also constantly monitors 1104 a width 802 of the displayed portion of the row 206 to detect 1106 a format transition condition 812 where the width crosses a predetermined format transition value 1002. "Constant monitoring" as contemplated herein may be accomplished by any mechanism which permits detection 1106 of the format transition condition 812 within five seconds or less. Suitable mechanisms may be implemented, e.g., with polling of the width, or with a notification or interrupt or message or event that is triggered when the width is changed or when a command to change the width is received.

The method also automatically relocates 1108 at least a portion of the graphical content, by a processor 110, to a portion of the row in a second format 816 in response to the format transition condition 812. That is, the format in use changes 1110 from the first format to the second format, so that the graphical content displayed in the row to a user (i.e., visible 1114 content) changes 1112 in at least one of the following ways: (a) graphical content which before the format transition condition was not displayed (i.e., was not visible) but was available for display in a horizontal scroll format is displayed (i.e., is visible) after the format transition condition in a fixed format, or (b) graphical content which before the format transition condition was displayed (i.e., was visible) in a fixed format is not displayed (i.e., is not visible) after the format transition condition but is available for display in a horizontal scroll format. In case (a), the display changes 1110 from a horizontal scroll format to a fixed format. In case (b), the display changes 1110 from a fixed format to a horizontal scroll format.

Some methods automatically relocate 1108 at least a portion of the graphical content, by a processor 110, to a portion of the row in a third format 816 in response to a format transition condition 812. In the third format N graphical items are displayed in a fixed format in the row 206, and N differs from the number of items displayed in the row in the first format or in the second format. For instance, in one situation the first format is a horizontal scroll format as illustrated in FIG. 7B, the second format is a six-slot fixed format as illustrated in FIG. 7C or FIG. 7D, and the third format is an eight-slot fixed format (N equals eight) as illustrated in FIG. 7E or FIG. 7F. In another situation the first format is an eight-slot fixed format as illustrated in FIG. 7F, the second format is a horizontal scroll format as illustrated in FIG. 7G, and the third format is a fourteen-slot fixed format as illustrated in FIG. 7H (N equals fourteen). In another situation the first format is an eight-slot fixed format as illustrated in FIG. 7F or FIG. 5, the second format is a six-slot fixed format as illustrated in FIG. 7C or FIG. 7D or FIG. 4, and the third format is a twelve-slot fixed format as illustrated in FIG. 6 (N equals twelve). One of skill will understand that the teachings herein also apply in many other situations.

Some methods automatically relocate 1108 at least a portion of the graphical content, by a processor, to the displayed portion of the row in each of at least three of the following formats 816 in response to a respective format transition condition 812: a horizontal scroll format, a fixed format with six graphical items displayed in the row, a fixed format with eight graphical items displayed in the row, a fixed format with ten graphical items displayed in the row, a fixed format with twelve graphical items displayed in the row.

Some methods automatically relocate 1108 at least a portion of the graphical content, by a processor, to the displayed portion of the row in each of at least three of the following formats 816 in response to a respective format transition condition 812: a fixed format with less than six graphical items displayed in the row, a fixed format with between six and eight graphical items displayed in the row, a fixed format with nine or ten graphical items displayed in the row, a fixed format with eleven or twelve graphical items displayed in the row, a fixed format with more than twelve graphical items displayed in the row.

Some methods detect 1106 the format transition condition when the width of the row changes as a result of at least one of the following events, e.g., by detecting at least one of the following events: a window 502 of the graphical user interface which contains the displayed portion of the row is resized 1128; the computing device screen 130 or the graphical user interface 128 changes 1132 between a landscape mode and a portrait mode; the graphical user interface is relocated 1134 from one screen 130 to another screen. Relocation 1134 between screens may or may not also involve changing between individual devices 102. In one case, the relocation 1134 is from a first hardware screen of a first computing device to a second hardware screen which is also connected to the first computing device. In another case, the graphical user interface is relocated 1134 from the first hardware screen of the first computing device to a third hardware screen which is connected to a second computing device. The terms "first", "second" and "third" merely indicate different screens are involved; in this particular case "third screen" does not mean that the second device must have three screens.

As noted, a window 502 or other display area 202 may change size without necessarily crossing a format transition value 1002. In such cases, graphical content may be resized 1116 without transitioning 1110 between formats 816. FIG. 7 illustrates resizing 1116 without transitioning 1110 in the move from FIG. 7C to FIG. 7D, and in the move from FIG. 7E to FIG. 7F. More generally, in some situations the graphical user interface displays 1102 a number of the graphical items in a fixed format, the displayed portion of the row has an area which changes 1148 to a new area by changing at least one dimension, and the method resizes 1116 the graphical items displayed in the row to match the new area without changing 1124 the number 1008 of graphical items of the row which are displayed.

In some implementations, each of the graphical items has a minimum width 902. In particular, each of the graphical items may have the same minimum width. A tolerance 1004 may be used 1138 for predetermined format transition values 1002. For instance, transition 1110 between formats may occur when the current display area width 802 is within a tolerance of an integer multiple of the minimum width. The tolerance 1004 may be a value which is no more than one fifth of the minimum width, or no more than one tenth of the minimum width, for example.

Instead of detecting changes in dimension, e.g., px count for display area width, some implementations monitor for format transitions by detecting 1136 a change in the number of items 126 shown. For instance, when a scrolling display in a system 102 is stretched enough to show M items, the system 102 may automatically transition 1110 to a fixed format with M display slots.

Regardless of whether a tolerance is used 1138, transitions 1110 may include changing 1110 between scrollable and fixed formats, or changing 1142 between two fixed formats with different numbers of slots 402. Changing 1110 between scrollable and fixed formats involves enabling 1118 or disabling 1120 scrolling 1122 as a user interface command.

FIG. 12 also illustrates processes provided or used in some embodiments. As with FIG. 11, one of skill will understand that the flowchart 1200 shown can be traversed in various ways during different performances of the illustrated processes. For instance, one process instance may include enabling 1118 a scroll format whereas another process instance includes disabling 1120 scrolling. Similarly, one process instance may include multiple monitoring steps 1104 in the form of polling before a change in the display area 202 is detected 1106, whereas another process instance includes only a single monitoring step 1104 before a change in the display area 202 is detected 1106, and yet another process instance begins with a notification 1106 of a change in the display area 202.

As indicated by the dashed box for step 1102, the illustrated process may begin before or after graphical content of one or more items 126 has been displayed. That is, one may being monitoring 1104 after one or more items 126 has been displayed, or instead one may treat the change from no items displayed to at least one item displayed as a change in display area dimensions from zero to positive dimensions and thus as a detection step 1106. At decision point 1202, one or more tests are performed to determine whether any format transition condition 812 is now met. As one example, current display area width 802 may be compared to one or more snap points 1002 to determine whether a snap point has been crossed. As another example, a device's ID(s) 134 may be compared to one or more values 1002 that correspond to different device categories (phone, tablet, laptop, etc.) to determine whether a different kind of device is now being used. If a format transition condition 812 is met, then the process transitions 1110 to a corresponding format 816 for graphical items 126 and the display area 202 is updated 1204 accordingly using familiar rendering techniques. If no format transition condition 812 was met at decision point 1202, then the process resizes 1116 displayed items (i.e., resizes displayed content 204 of items 126) without transitioning formats, that is, while continuing to use 1206 the same display format 816 as was in use at decision point 1202.

Monitoring 1104 for changes then continues after either transitioning 1110 formats or resizing 1116 without a format transition.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as format transition snap points 1002, format transition conditions 812, and a list display controller 806, in the form of data 118 and instructions 116, read from a removable medium 114 and/or another source such as a network connection, to form a configured medium. The configured medium 112 is capable of causing a computer system to perform technical process steps for adjusting list content density 1010 as disclosed herein. The Figures thus help illustrate configured storage media embodiments and process embodiments, as well as system and process embodiments. In particular, any of the process steps illustrated in FIG. 11, FIG. 12, or otherwise taught herein, may be used to help configure a storage medium to form a configured medium embodiment.

Some examples use or provide a computer-readable storage medium 112 configured with data 118 and instructions 116 which upon execution with a processor 110 perform a method for dynamically relocating graphical content 204 that is displayed in a graphical user interface 128, thereby adjusting 1146 content density in response to changes in the area 202 available through the graphical user interface for displaying the graphical content. This method includes displaying 1102 a number of graphical items 126 in a first format 816 within the graphical user interface on a first hardware screen 130 of a first computing device 102. The graphical items include graphical content 204. The first format is one of: a horizontal scroll format (e.g., as in FIGS. 3, 7A, 7B, 7G) or a fixed format (e.g., as in FIGS. 4, 5, 6, 7C, 7D, 7E, 7F, 7H). The method also includes detecting 1106 a change in the number of graphical items to be displayed, the change being such that the number of graphical items to be displayed crosses a predetermined format transition value 1002. The method also includes automatically performing, by a processor, at least one of the following format transitions: (a) relocating 1108 at least a portion of at least one of the graphical items so that graphical content which, before the format transition was not displayed but was available for display in a horizontal scroll format, is displayed after the format transition in a fixed format; (b) relocating 1108 at least a portion of at least one of the graphical items so that graphical content which, before the format transition was displayed in a fixed format, is not displayed after the format transition but is available for display in a horizontal scroll format; (c) as a display area 202 containing the displayed graphical items is continuously resized 1128, continuously resizing 1116 the displayed graphical items in a fixed format having M graphical items displayed and then as the display area continues being resized displaying the displayed graphical items in a fixed format having N graphical items displayed, with M and N being different positive integers.

In some examples which use or provide the method, at least one of the following conditions is met: the number of graphical items displayed in the first format decreases and the format transition changes 1118 the display from a fixed format to a horizontal scroll format; the number of graphical items displayed in the first format increases and the format transition changes 1120 the display from a horizontal scroll format to a fixed format; the format transition changes 1124 the display from a fixed format displaying N items to a fixed format displaying M items, where N and M are each a positive multiple of K, and K is an integer larger than 1. In some cases, each of the graphical items 126 has the same width 900. In some, the format transition includes at least one of the relocating steps.

In some cases, the format transition includes continuously and correspondingly resizing 1116 the displayed graphical items as a display area 202 of the row is continuously resized while displaying M graphical items in a fixed format and then as the display area continues being resized displaying 1102 N graphical items in a fixed format, with M and N being different non-consecutive positive integers.

In some cases, the method includes transitioning 1118 or 1120 between a fixed format and a horizontal scroll format in conjunction with moving the displayed graphical items 126 between the first hardware screen of the first computing device and a second hardware screen of a second computing device.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the medium combinations and variants describe above.

In particular, some examples display 1102 a list of items horizontally for different form factors like Phone, Tablets, Xbox® systems, PCs, etc. (mark of Microsoft Corporation). Some automatically choose a desired content density for a given form factor and screen size. Some fill the available space uniformly so that there are no blank spaces on the screen. In some examples, content 204 aligns vertically with similar list content that is vertically positioned above or below it to give good visual appeal. This is illustrated, e.g., in FIGS. 4, 5, and 6.

Some examples provide a user experience as follows. On a phone, the user experiences a list of items which are horizontally scrollable. On a tablet or PC, the user experiences a fixed (non-scrollable) list of items based on screen resolution (e.g., with 6, 8, 10 or 12 slots). On an Xbox® system or another system which provides a so-called "ten foot experience", the user experiences a fixed list of items based on screen resolution and a scale factor that governs resizing to provide legibility at the expected viewing distance.

Some examples include or use a list display controller which serves as a device-generic solution that works based on screen size to determine the mode the screen is in. This is all taken care of in a single control tool which adapts accordingly to the available screen size. For narrower layouts, the control adapts itself to a narrow mode where it shows five items in the list, which is scrollable. For wider layouts, the control adapts itself to a 6, 8, 10 or 12 column mode based on how many items can be shown on screen in a legible and easily selectable manner. For any screen size different than these snap points, the list falls back to the previous snap point while responsively growing each item in the list to fill all the available display space while maintaining the content's aspect ratio.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 11 and 12 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computational system for dynamically adjusting content density by controlling whether a list displayed in a graphical user interface is scrollable, the system comprising:
    a memory;
    a list of graphical items residing in the memory;
    a display subsystem having a hardware screen with a display area, a portion of the display area being available through the graphical user interface for displaying one or more of the graphical items in a list format, the list format having a visual orientation which is a vertical orientation or a horizontal orientation, the display area portion having dimensions which include a width and a height;
    a processor in operable communication with the memory and the display subsystem; and
    a list display controller which controls the processor to monitor the display subsystem to detect a display area portion change which alters the width or height of the display area portion and to automatically disable scrolling of displayed items along the visual orientation when a predetermined dimension of the display area portion along the visual orientation exceeds a predetermined threshold and to otherwise automatically enable such scrolling.

2. The system of claim 1, wherein each of the graphical items has a respective minimum size along an axis parallel to the visual orientation, and the predetermined threshold is a value which is not more than six times the smallest of the one or more minimum sizes.

3. The system of claim 1, wherein the display subsystem includes at least one hardware screen whose display area portion dimension exceeds the predetermined threshold and also includes at least one other hardware screen whose display area portion dimension does not exceed the predetermined threshold.

4. The system of claim 1, wherein the display subsystem comprises a hardware phone screen having a phone screen display area, the display subsystem also comprises a hardware larger screen, the hardware larger screen has a larger screen display area which is larger than the phone screen display area, and the list display controller controls the processor to transition from a horizontal scroll format as the list format on the hardware phone screen to a fixed format as the list format on the hardware larger screen.

5. The system of claim 1, wherein the display subsystem includes at least three hardware screens with respective display area portions having different respective dimensions, and the list display controller controls the processor to display a different respective number of the graphical items at a time on each respective hardware screen based on the respective dimensions of the hardware screens without scrolling the displayed graphical items along the visual orientation on any of the three hardware screens.

6. The system of claim 1, wherein the list display controller automatically disables scrolling of displayed graphical items along the visual orientation when an entire displayed page of the graphical items can be swiped from display as a unit by a user command directed to the list display controller.

7. The system of claim 1, wherein the visual orientation is a horizontal orientation, the list display controller compares the display area portion width to at least one template width of a group of at least three different template widths, the list display controller identifies the largest template width which fits within the display area portion width, and the list display controller specifies a number of the graphical items to display in a fixed format row in the display area portion based on the identified template width.

8. The system of claim 1, wherein the display subsystem comprises a phone screen and also comprises at least one of the following hardware screens: a tablet screen, a laptop screen, a game system screen, a television screen, a hardware screen which has at least four times as much display area as the phone screen.

9. A computer-implemented method for dynamically adjusting content density by relocating graphical content within an underlying row displayed in a graphical user interface, the method comprising:
    displaying graphical content of a first graphical item in a first format in a displayed portion of the row within the graphical user interface on a first hardware screen of a first computing device;
    displaying at least a portion of graphical content of at least one additional graphical item in the first format in the displayed portion of the row within the graphical user interface;
    constantly monitoring a width of the displayed portion of the row to detect a format transition condition where the width crosses a predetermined format transition value; and
    automatically relocating at least a portion of the graphical content, by a processor, to a portion of the row in a second format in response to the format transition condition so that the graphical content displayed in the row to a user changes in at least one of the following ways: (a) graphical content which before the format transition condition was not displayed but was available for display in a horizontal scroll format is displayed after the format transition condition in a fixed format, or (b) graphical content which before the format transition condition was displayed in a fixed format is not displayed after the format transition condition but is available for display in a horizontal scroll format.

10. The method of claim 9, wherein the method further comprises automatically relocating at least a portion of the graphical content, by a processor, to a portion of the row in a third format in response to a format transition condition such that in the third format N graphical items are displayed in a fixed format in the row, and N differs from the number of items displayed in the row in the first format or in the second format.

11. The method of claim 9, wherein the method comprises automatically relocating at least a portion of the graphical content, by a processor, to the displayed portion of the row in each of at least three of the following formats in response to a respective format transition condition: a horizontal scroll format, a fixed format with six graphical items displayed in the row, a fixed format with eight graphical items displayed in the row, a fixed format with ten graphical items displayed in the row, a fixed format with twelve graphical items displayed in the row.

12. The method of claim 9, wherein the method comprises detecting the format transition condition when the width of the row changes as a result of at least one of the following events:
- a window of the graphical user interface which contains the displayed portion of the row is resized;
- the computing device screen or the graphical user interface changes between a landscape mode and a portrait mode;
- the graphical user interface is relocated from the first hardware screen of the first computing device to a second hardware screen which is also connected to the first computing device; or
- the graphical user interface is relocated from the first hardware screen of the first computing device to a third hardware screen which is connected to a second computing device.

13. The method of claim 9, wherein the graphical user interface displays a number of the graphical items in a fixed format, the displayed portion of the row has an area which changes to a new area, and the method comprises resizing the graphical items displayed in the row to match the new area without changing the number of graphical items of the row which are displayed.

14. The method of claim 9, wherein each of the graphical items has a minimum width, each of the graphical items has the same minimum width, the predetermined format transition value is within a tolerance of an integer multiple of the minimum width, and the tolerance is a value which is no more than one fifth of the minimum width.

15. A computer-readable storage medium configured with data and instructions which upon execution perform a method for dynamically relocating graphical content that is displayed in a graphical user interface, thereby adjusting content density in response to changes in the area available through the graphical user interface for displaying the graphical content, the method comprising:
- displaying a number of graphical items in a first format within the graphical user interface on a first hardware screen of a first computing device, the graphical items including graphical content, the first format being one of: a horizontal scroll format or a fixed format;
- detecting a change in the number of graphical items to be displayed, the change being such that the number of graphical items to be displayed crosses a predetermined format transition value; and
- automatically performing, by a processor, at least one of the following format transitions:
  - (a) relocating at least a portion of at least one of the graphical items so that graphical content which, before the format transition was not displayed but was available for display in a horizontal scroll format, is displayed after the format transition in a fixed format;
  - (b) relocating at least a portion of at least one of the graphical items so that graphical content which, before the format transition was displayed in a fixed format, is not displayed after the format transition but is available for display in a horizontal scroll format;
  - (c) as a display area containing the displayed graphical items is continuously resized, continuously resizing the displayed graphical items in a fixed format having M graphical items displayed and then as the display area continues being resized displaying the displayed graphical items in a fixed format having N graphical items displayed, with M and N being different positive integers.

16. The computer-readable storage medium of claim 15, wherein at least one of the following conditions is met:
- the number of graphical items displayed in the first format decreases and the format transition changes the display from a fixed format to a horizontal scroll format;
- the number of graphical items displayed in the first format increases and the format transition changes the display from a horizontal scroll format to a fixed format;
- the format transition changes the display from a fixed format displaying N items to a fixed format displaying M items, where N and M are each a positive multiple of K, and K is an integer larger than 1.

17. The computer-readable storage medium of claim 15, wherein each of the graphical items has the same width.

18. The computer-readable storage medium of claim 15, wherein the format transition comprises at least one of the relocating steps.

19. The computer-readable storage medium of claim 15, wherein the format transition comprises continuously and correspondingly resizing the displayed graphical items as a display area of the row is continuously resized while displaying M graphical items in a fixed format and then as the display area continues being resized displaying N graphical items in a fixed format, with M and N being different non-consecutive positive integers.

20. The computer-readable storage medium of claim 15, wherein the method comprises transitioning between a fixed format and a horizontal scroll format in conjunction with moving the displayed graphical items between the first hardware screen of the first computing device and a second hardware screen of a second computing device.

* * * * *